US008315785B2

(12) United States Patent
Okuyama

(10) Patent No.: US 8,315,785 B2
(45) Date of Patent: Nov. 20, 2012

(54) DATA COMMUNICATION DEVICE, DATA COMMUNICATION SYSTEM, AND RECORDING MEDIUM

(75) Inventor: Kyouko Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 12/618,188

(22) Filed: Nov. 13, 2009

(65) Prior Publication Data

US 2010/0138140 A1 Jun. 3, 2010

(30) Foreign Application Priority Data

Dec. 2, 2008 (JP) ................................ 2008-307558

(51) Int. Cl.
*G06F 19/00* (2006.01)
(52) U.S. Cl. ........................................................ 701/117
(58) Field of Classification Search ........................ None
See application file for complete search history.

(56) References Cited

U.S. PATENT DOCUMENTS 5,961,571 A * 10/1999 Gorr et al. ..................... 701/494
6,577,946 B2 * 6/2003 Myr .............................. 701/117
2002/0040271 A1 * 4/2002 Park et al. ..................... 701/209
2004/0260458 A1 * 12/2004 Park et al. ..................... 701/200

FOREIGN PATENT DOCUMENTS

JP 7-129893 5/1995
JP 11-86184 3/1999
JP 2006-184084 7/2006

* cited by examiner

*Primary Examiner* — Thomas Tarcza
*Assistant Examiner* — Nagi Murshed
(74) *Attorney, Agent, or Firm* — Staas & Halsey LLP

(57) ABSTRACT

The data communication device and method include storing road map information indicating locations of nodes and links, a time when a vehicle enters one link and an identifier of the link, and a vehicle location and the link identifier in a memory, periodically acquiring vehicle position data, identifying the link based on the road map information, and comparing the identified link with the link the vehicle has passed through a node. The device rewrites the position data and acquired time stored in the memory when receiving a result that the vehicle has not passed, determines an exit time based on the acquired time and the time of last acquired position data when receiving a result that the vehicle has passed, calculates a travel period of the vehicle, writes the exit time as an entry time, rewrites the link identification data, and transmits the travel period to a given communication destination.

20 Claims, 17 Drawing Sheets

FIG. 2

7

| SECONDARY MESH NUMBER | NODE NUMBER 1 | NODE NUMBER 2 | LINK LENGTH (m) | DIRECTION | TIME SLOT 00:00–00:05 | | TIME SLOT 00:05–00:10 | | ... |
|---|---|---|---|---|---|---|---|---|---|
| | | | | | NUMBER OF PASSING VEHICLES | TRAVEL TIME (SECONDS) | NUMBER OF PASSING VEHICLES | TRAVEL TIME (SECONDS) | ... |
| 493275 | 4123 | 4125 | 285 | 1 | 10 | 17.1 | 15 | 16.8 | ... |
| 493275 | 4123 | 4125 | 285 | 0 | 5 | 18.2 | 12 | 17.5 | ... |
| 493275 | 4124 | 4125 | 417 | 1 | 22 | 26.1 | 18 | 24.0 | ... |
| ... | ... | ... | ... | ... | ... | ... | ... | ... | ... |

FIG. 9

32

| | | |
|---|---|---|
| ENTRY TIME | | 07:29:59 |
| DATA ABOUT LOCATION CLOSEST TO ENTRY POINT AMONG ACQUIRED DATA | TIME | 07:30:00 |
| | LATITUDE | 34.68372 |
| | LONGITUDE | 134.9576 |
| LINK IDENTIFICATION DATA | SECONDARY MESH NUMBER | 513445 |
| | NODE NUMBER 1 | 1234 |
| | NODE NUMBER 2 | 5678 |

FIG. 10

33

| | | | |
|---|---|---|---|
| ACQUIRED DATA | ACQUIREMENT TIME | | 07:30:02 |
| | POSITION DATA | LATITUDE | 34.68379 |
| | | LONGITUDE | 134.9576 |
| LINK IDENTIFICATION DATA | SECONDARY MESH NUMBER | | 513445 |
| | NODE NUMBER 1 | | 1234 |
| | NODE NUMBER 2 | | 5678 |

FIG. 11A

34

WHERE DATA TYPE IS "1: TRAVEL TIME IS ACQUIRED"

| DATA TYPE | LINK IDENTIFICATION DATA | | | TRAVEL TIME (SECONDS) | ACQUIRED DATA ABOUT LOCATION CLOSEST TO ENTRY POINT | | | ACQUIRED DATA ABOUT LOCATION CLOSEST TO EXIT POINT | | |
|---|---|---|---|---|---|---|---|---|---|---|
| | SECONDARY MESH NUMBER | NODE NUMBER 1 | NODE NUMBER 2 | | TIME | LATITUDE | LONGITUDE | TIME | LATITUDE | LONGITUDE |
| 1 | 513445 | 1234 | 5678 | 28.5 | 07:30:00 | 34.6837 | 134.9576 | 07:30:28 | 34.6838 | 134.9576 |

FIG. 11B

34

WHERE DATA TYPE IS "2: TRAVEL TIME CANNOT BE ACQUIRED"

| DATA TYPE | LINK IDENTIFICATION DATA | | | TRAVEL TIME (SECONDS) | ACQUIRED DATA ABOUT LOCATION CLOSEST TO ENTRY POINT | | | ACQUIRED DATA ABOUT LOCATION CLOSEST TO EXIT POINT | | |
|---|---|---|---|---|---|---|---|---|---|---|
| | SECONDARY MESH NUMBER | NODE NUMBER 1 | NODE NUMBER 2 | | TIME | LATITUDE | LONGITUDE | TIME | LATITUDE | LONGITUDE |
| 2 | 513445 | 5678 | 2345 | | 07:31:50 | 34.6838 | 134.9600 | 07:32:20 | 34.6839 | 134.9605 |

FIG. 11C

34

WHERE DATA TYPE IS "3: TRAVEL TIME IS ESTIMATED"

| DATA TYPE | LINK IDENTIFICATION DATA | | | TRAVEL TIME (SECONDS) | ACQUIRED DATA ABOUT LOCATION CLOSEST TO ENTRY POINT | | | ACQUIRED DATA ABOUT LOCATION CLOSEST TO EXIT POINT | | |
|---|---|---|---|---|---|---|---|---|---|---|
| | SECONDARY MESH NUMBER | NODE NUMBER 1 | NODE NUMBER 2 | | TIME | LATITUDE | LONGITUDE | TIME | LATITUDE | LONGITUDE |
| 3 | 513445 | 7890 | 4567 | 126 | 07:32:25 | 34.6839 | 134.9606 | | | |

FIG. 12

34b

| ID | DATA TYPE | LINK IDENTIFICATION DATA | | | TRAVEL TIME (SECONDS) | POSITION DATA ABOUT LOCATION CLOSEST TO ENTRY POINT | | | POSITION DATA ABOUT LOCATION CLOSEST TO EXIT POINT | | |
|---|---|---|---|---|---|---|---|---|---|---|---|
| | | SECONDARY MESH NUMBER | NODE NUMBER 1 | NODE NUMBER 2 | | TIME | LATITUDE | LONGITUDE | TIME | LATITUDE | LONGITUDE |
| 1 | 1 | 513445 | 1234 | 5678 | 28.5 | 07:30:00 | 34.6837 | 134.9576 | 07:30:28 | 34.6838 | 134.9576 |
| 2 | 2 | 513445 | 5678 | 2345 | | 07:31:50 | 34.6838 | 134.9600 | 07:32:20 | 34.6839 | 134.9605 |
| 3 | 3 | 513445 | 7890 | 4567 | 126 | 07:32:25 | 34.6839 | 134.9606 | | | |
| ... | ... | ... | ... | ... | ... | ... | ... | ... | ... | ... | ... |

DATA COMMUNICATION DEVICE, DATA COMMUNICATION SYSTEM, AND RECORDING MEDIUM

CROSS-REFERENCE TO RELATED APPLICATIONS

This application is based upon and claims the benefit of priority of the prior Japanese Patent Application No. 2008-307558, filed on Dec. 2, 2008, the entire contents of which are incorporated herein by reference.

BACKGROUND

1. Field

The embodiment(s) discussed herein is (are) related to a data communication device that is carried into or mounted on a vehicle to notify an external device of actual driving condition(s) in a road network, a data communication device for notifying an external device of driving condition(s) and receiving information about a time required to reach a destination from the external device, a data communication system, an information gathering method to be implemented in a traffic information providing system, and a recording medium storing a computer program for a data communication device.

2. Description of the Related Art

There have been services, such as telematics services, for providing the latest traffic information to drivers and passengers on vehicles. A service user may obtain information from a service center by using a terminal device such as a portable telephone device, a small-size computer, or a car navigation device, and connecting the vehicle to the Internet.

In this kind of services, automobiles driven by service users (hereinafter referred to as the user vehicles) are regarded as probe cars for information gathering. Accordingly, so-called vehicle information related to driving is transmitted as probe information from user vehicles to the service center. The service center processes the vehicle information from user vehicles actually driving on roads, so that the traffic information reflects the vehicle information. The service users not only receive information but also contribute to reinforcement and updating of the traffic information to be provided.

The traffic information to be provided contains the travel period of each link in a road network represented by nodes and links. A regular node is an intersection, and a link may be a section of a road divided by intersections. The travel period is the time required for a vehicle to pass through one link. The travel period is affected by traffic congestion and the weather, and normally varies among the time slots in each day. Based on the vehicle information from user vehicles, the service center determines the mean travel period of each link in each given time slot, and creates a database. In a car navigation system, for example, the travel periods provided from the service center are used for calculating the time required to travel from a departure point to a destination point. The required time is determined by adding up the travel periods of the respective links corresponding to the travel route from the departure point to the destination point.

Normally, the calculation of the travel period of each link is performed at the service center. Position measurement information indicating the current position is transmitted from each user vehicle to the service center at given intervals. (see Japanese Laid-Open Patent Publication Nos. 11-86184 and 7-129893)

A typical on-vehicle navigation device acquires position data (the latitude and longitude) at intervals of 0.1 to 1 second through a GPS reception device and a beacon reception device. The navigation device transmits the accumulated position data together with the respective acquired times to the service center at regular intervals of approximately 5 minutes. At the service center, a computer (hereinafter referred to as the server) provided in the center gathers the vehicle information from user vehicles, and accumulates the vehicle information in a memory.

Every 10 minutes or so, the server performs map matching about each user vehicle, and identifies the link the subject user vehicle has just passed through. The server then calculates the travel period of the identified link. If there is only the position data about part of the link, the travel period is hard to be determined. Therefore, the travel period calculation is put on hold till the next operation. The server performs processing on all the position data gathered over a given period of time, so as to count the number of passing vehicles and calculate the mean travel period for each link.

Other than the above system, there have been systems in which travel period calculations are performed on the vehicle side. Instead of a server, a navigation device mounted on a vehicle accumulates position data the navigation device has acquired over a given period of time. After performing map matching for determining a link at given intervals, the navigation device calculates the travel period of the link. The server at the service center gathers travel periods from vehicles, and updates the traffic information to be distributed to the vehicles. (see Japanese Laid-Open Patent Publication No. 2006-184084)

SUMMARY

It is an aspect of the embodiments discussed herein to provide a data communication device that is capable of being mounted on a vehicle.

The data communication device and method include storing road map information indicating locations of a plurality of nodes assigned with numbers in a road network that is represented by the plurality of nodes and a plurality of links each connecting two adjacent ones of the nodes, storing a time when a vehicle enters one link among the plurality of links, and identification data about the link corresponding to the time, storing a location of the vehicle at a certain time and identification data about the link corresponding to the location, periodically acquiring position data indicating a location of the vehicle, identifying the link corresponding to the acquired latest position data based on the road map information every time position data is acquired, and comparing the identified link with the link stored in the third memory to determine whether the vehicle has passed through a node.

The data communication device includes a first updating unit receiving a determination result indicating that the vehicle has not passed through the node, and rewriting the position data and acquired time stored in the third memory to the last acquired position data and acquired time, a calculating unit receiving a determination result indicating that the vehicle has passed through the node, determining an exit time based on the acquired time stored in the third memory and the time when the position measuring unit has last acquired position data, and calculating a travel period that is the time required for the vehicle to pass through the link from which the vehicle has last exited, based on the determined exit time and the entry time stored in the second memory, a second updating unit writing the exit time last determined by the calculating unit as an entry time in place of the entry time stored in the second memory after the end of the travel period calculation, and rewriting the link identification data stored in the second memory to the identification data about the link last identified by the determining unit; and a transmitting unit transmitting the calculated travel period and the identification data about the corresponding link to a given communication destination.

The object and advantages of the embodiment discussed herein will be realized and attained by means of elements and combinations particularly pointed out in the claims. Additional aspects and/or advantages will be set forth in part in the description which follows and, in part, will be apparent from the description, or may be learned by practice of the invention.

It is to be understood that both the foregoing general description and the following detailed and the following detailed description are exemplary and only are not restrictive exemplary explanatory are not restrictive of the invention, as claimed.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a chart depicting an example of a data structure of a traffic information database;

FIG. 9 is a chart depicting an example of a data structure of entry information;

FIG. 10 is a chart depicting an example of a data structure of latest position information;

FIGS. 11A to 11C are charts depicting examples of a data structure of vehicle information;

FIG. 12 is a chart depicting another example of a data structure of vehicle information;

DETAILED DESCRIPTION OF EMBODIMENTS

Figure 1:
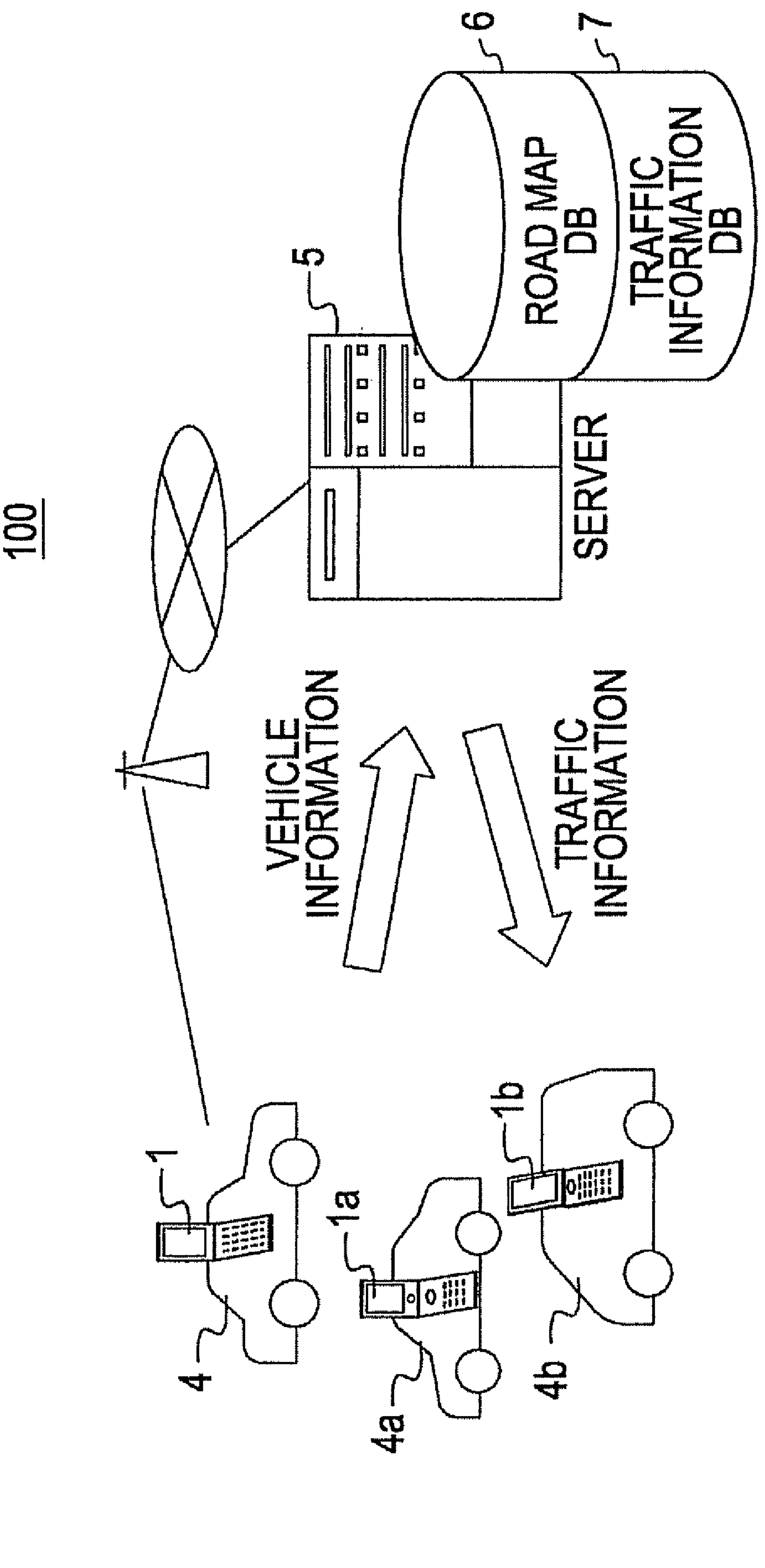
FIG. 1 is a diagram depicting an example of a data structure of a traffic information providing system.

Reference will now be made in detail to the embodiments, examples of which are illustrated in the accompanying drawings, wherein like reference numerals refer to the like elements throughout. The embodiments are described below to explain the present invention by referring to the figures.

In a typical data processing operation in which a travel period is calculated based on position data accumulated over a given period of time as described above, it is necessary to prepare a memory with capacity large enough to store all the position data acquired during the given period of time. When the travel period is calculated on a vehicle, a terminal device mounted on the vehicle has such a memory. However, where a portable device such as a portable telephone device or a PDA (Personal Data Assistant) is used as the terminal device, a stricter limit is set on the capacity of the memory accumulating data than in a case where an on-vehicle device fixed to the vehicle is used.

In a service system in which a user vehicle serves as a probe car, on the other hand, a small amount of data to be transmitted from the user vehicle to the service center is preferable for a service user who pays communication fees. To reduce the amount of data to be transmitted, calculating the travel period on the vehicle and transmitting the travel period to the service center is more advantageous than transmitting position data from the vehicle and calculating the travel period at the service center.

Furthermore, in a typical service system, the travel period is not calculated while the vehicle stays on one link due to traffic congestion, for example. This leads to a problem that the information indicating traffic congestion is not promptly transmitted to other vehicles.

The embodiment(s) has(have) been made in view of these circumstances and other existing problems, and an object thereof is to provide a data communication device that is capable of transmitting the travel period with efficient use of a memory, and a system that includes the data communication device. Another object of the invention is to swiftly transmit the information indicating the travel period.

Services to distribute traffic information to vehicles are realized by traffic information providing system 100 depicted in FIG. 1. The traffic information providing system 100 includes user vehicles 4, 4*a*, and 4*b*, and a server 5 provided at a service center. Service users (not depicted) having portable telephone devices 1, 1*a*, and 1*b* as terminal devices get into the user vehicles 4, 4*a*, and 4*b*, respectively. The portable telephone devices 1, 1*a*, and 1*b* perform data communications with the server 5 via a wireless base station or a packet switching network. The portable telephone devices 1, 1*a*, and 1*b* transmit vehicle information including a travel period to the server 5. The travel period is calculated in the later-described manner.

The server 5 includes a road map database 6 and a traffic information database 7. The road map database 6 stores nodes and links in a road network containing service areas. In response to requests, part of the information stored in the road map database 6 is downloaded into the portable telephone devices 1, 1*a*, and 1*b*. The traffic information database 7 is updated whenever necessary, in accordance with the vehicle information from the user vehicles 4, 4*a*, and 4*b*. The server 5 uses a call connection that receives the vehicle information, and transmits the traffic information to each connected vehicle. The traffic information might be distributed simultaneously to the user vehicles 4, 4*a*, and 4*b*. Also, in response to a request issued from one of the user vehicles 4, 4*a*, and 4*b*, the server 5 might transmit the traffic information about the requested route only to the user vehicle having issued the request.

In the traffic information database 7, the number of passing vehicles and the mean travel period are managed in every five-minute time slot on each link, as depicted in FIG. 2. The time slots may not be set on a five minutes basis, and may be set in an arbitrary manner. For example, the lengths (a duration) of the time slots may vary between the daytime and the nighttime. Each of the links is identified by a secondary mesh number representing positions of sections obtained by partitioning the map, and node numbers 1 and 2 representing the nodes at both ends of the link. The value of the item "direction" identifies the traveling direction (upbound or downbound) on each link. The travel periods of the respective links are basically equivalent to the travel periods received from the user vehicles 4, 4*a*, and 4*b*. If travel periods about a certain time slot of a link are received from two or more vehicles, the mean value of the received travel periods is considered as the travel period. However, travel periods that are determined to be abnormal by the server 5 are excluded from the mean value calculation. When the travel period is updated, the type of data contained in the received data is also taken into consideration. The travel period updated as needed is added to the travel information to be distributed to the user vehicles 4, 4*a*, and 4*b*.

Each of the portable telephone devices 1, 1*a*, and 1*b* includes a data communication device related to the traffic information providing services. The portable telephone devices 1, 1*a*, and 1*b* each have the same structure as one another, and therefore, only the structure of the portable telephone device 1 is described below as a typical example.

Figure 3:
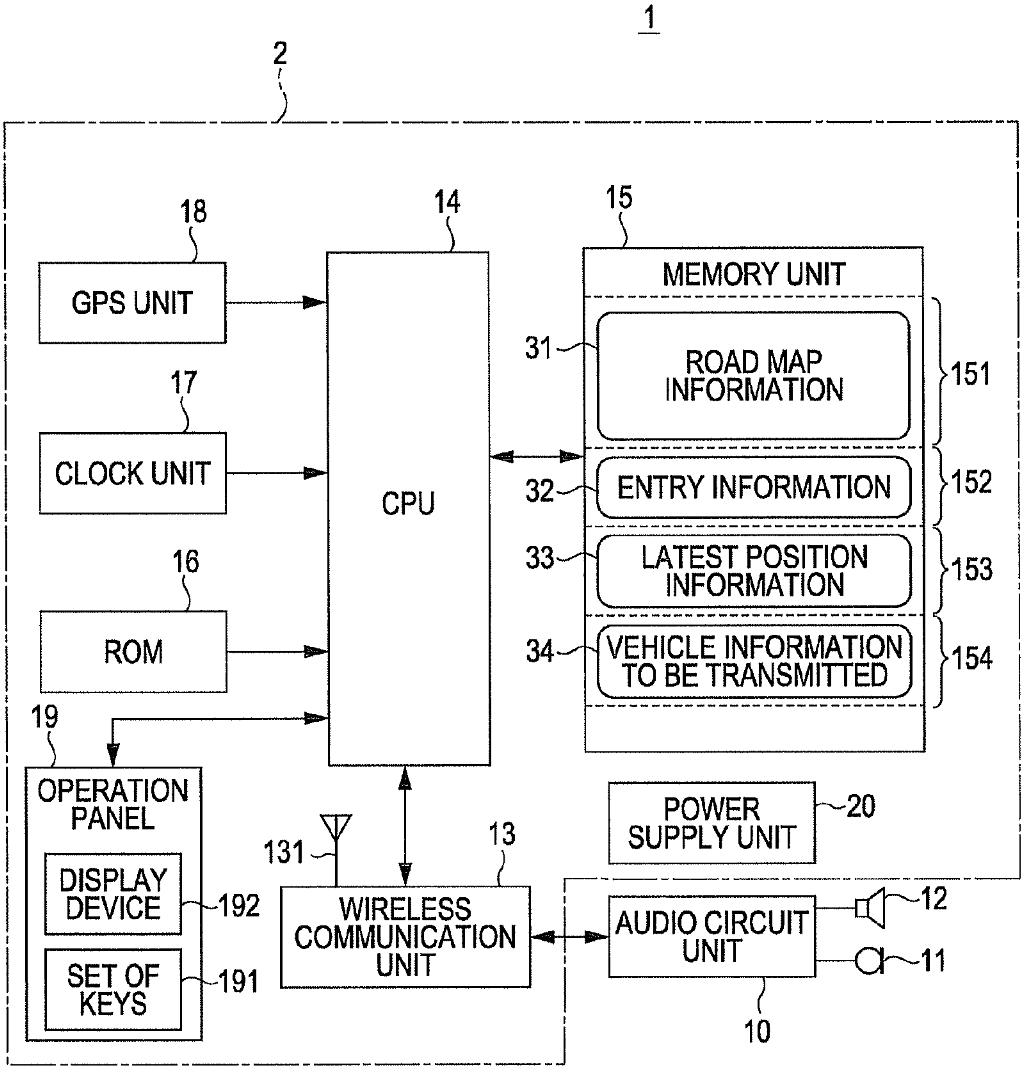
FIG. 3 is a diagram depicting a structure example of a portable telephone device including a data communication device according to an embodiment of the present invention.

As depicted in FIG. 3, the portable telephone device 1 includes an audio circuit unit 10 and a data communication device 2. The audio circuit unit 10 performs code conversions of audio signals and processing on audio range signals in a speech mode. The audio circuit unit 10 includes a microphone 11 and a speaker 12. The data communication device 2 has a function as a mobile terminal of the traffic information providing system 100, and a packet communication function of a regular portable telephone device for electronic mail exchanges and Web site viewings. When a given mode selecting operation is performed through an operation panel 19, the data communication device 2 functions as a mobile terminal of the traffic information providing system 100. The structure of the data communication device 2 serving as a mobile terminal is as follows.

The data communication device 2 includes a wireless communication unit 13, a CPU 14, a memory unit 15, a ROM 16, a clock unit 17, a GPS unit 18, the operation panel 19, and a power supply unit 20. The wireless communication unit 13 is formed with a high-frequency circuit for communications with the server 5, and includes an antenna 131 for transmission and reception. The CPU 14 is a microcomputer, and loads and executes a program from the ROM 16. The memory unit 15 is used as the work area for the program execution. The memory unit 15 is formed with one or more RAM devices (such as Dynamic Access Memory devices), and provides a first memory 151, a second memory 152, a third memory 153, and a fourth memory 154 for the CPU 14. The clock unit 17 constantly measures timing, and outputs data indicating the date and the current time to the CPU 14. The GPS unit 18 receives electric waves from satellites of a GPS (Global Positioning System) or a base station for mobile communications, and measures its own position. The GPS unit 18 includes a known function to calculate the latitude and longitude based on the electric waves from the satellites. The position data indicating a position measurement result is input to the CPU 14. The operation panel 19 includes a set of keys 191 for operation inputs, a liquid crystal display as a display device 192, a camera, and a vibrator. The operation panel 19 outputs key operation signals to the CPU 14. The power supply unit 20 has a charging battery as a main power source mounted therein.

The first memory 151 of the memory unit 15 stores road map information 31 about surrounding area(s) of a current position. The road map information 31 is downloaded from the server 5. The road map information 31 is part of the information stored in the road map database 6 managed by the server 5, and is the information about at least one section identified by a secondary mesh number. As the set value of the memory size of the first memory 151 is larger, information about a wider area may be taken into the data communication device 2.

The second memory 152 temporarily stores entry information 32. The entry information 32 indicates the link into which the user vehicle 4 carrying the data communication device 2 enters last time, and its entry time. However, the entry time is determined based on the times when the user vehicle 4 exists at two locations near the node on an entry side of the link into which the user vehicle 4 is entering. This is because position measurement is rarely carried out exactly when the actual entry is made, and the location at which the position measurement is carried out normally deviates from the entry point (the node position).

The third memory 153 temporarily stores the latest position information 33. The latest position information 33 indicates the latest position data and its acquired time. The latest position data is obtained by the CPU 14 between the time when the user vehicle 4 enters a link and the time when the user vehicle 4 exits from the link. The latest position information 33 is updated every time new position data is acquired. Therefore, the memory size of the third memory 153 may be the minimum size necessary to store the information corresponding only to one position.

The fourth memory 154 temporarily stores vehicle information to be transmitted to the server 5. In other words, the fourth memory 154 is used as a transmission buffer.

Figure 4:
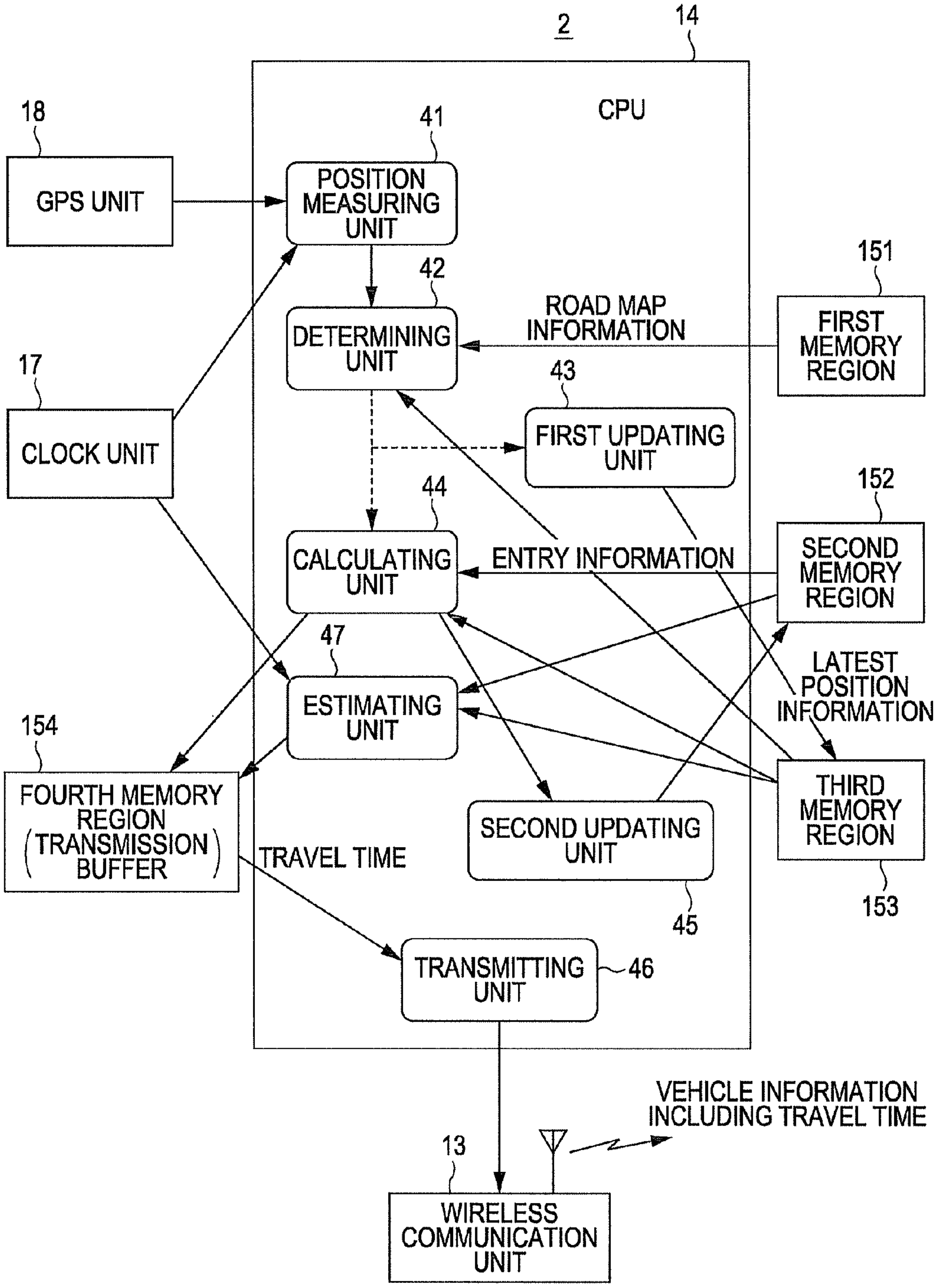
FIG. 4 is a diagram depicting a functional structure example of a data communication device.

FIG. 4 depicts an example of a functional structure of the data communication device 2. As depicted, the data communication device 2 includes a position measuring unit 41, a determining unit 42, a first updating unit 43, a calculating unit 44, a second updating unit 45, a transmitting unit 46, and an estimating unit 47. Those functional elements are realized by the CPU 14 and a program.

The position measuring unit 41 periodically acquires the positional data, which is the information indicating the current position of the user vehicle 4, from the GPS unit 18. More specifically, the positional data is formed with numerical values that represent the latitude and longitude. The positional data is acquired, for example, every one second. Every time the positional data is acquired, the position measuring unit 41 associates the positional data with its acquired time, and successively transmits the positional data to the determining unit 42.

The determining unit 42 identifies the link corresponding to the latest positional data acquired by the position measuring unit 41, based on the road map information stored in the first memory 151. The determining unit 42 further compares the identified link with the link indicated by the latest position information stored in the third memory 153. The determining unit 42 determines, based on the comparison result, whether the user vehicle 4 has passed through a node or whether the user vehicle 4 has exited from one of two links connected by a node and has entered into the other one of the two links connected by the node. If the compared two links are the same link, the determining unit 42 determines that the user vehicle 4 has not passed through a node (or there is no exit or entry). If the two links are not the same, the determining unit 42 estimates that the user vehicle 4 has entered the identified link and has exited from the other link, and therefore determines that the user vehicle 4 has passed through a node.

Upon receipt of a determination result indicating that the user vehicle 4 has not passed through a node from the determining unit 42, the first updating unit 43 rewrites the position data and the acquired time in the latest position information stored in the third memory 153, to the position data acquired last time and its acquired time. In other words, the first updating unit 43 updates the latest position information every time position measurement is carried out, and stores the position data acquired last time and its acquired time into the third memory 153, while the user vehicle 4 is traveling on one link.

Upon receipt of a determination result indicating that the user vehicle 4 has passed through a node from the determining unit 42, the calculating unit 44 determines the latest exit time, based on the acquired time stored in the third memory 153 and the time when the position measuring unit 41 acquired the position data last time. Through this determination, the latest entry time is also determined. The calculating unit 44 further calculates a period of time from the entry time stored in the second memory 152 to the determined exit time, or the period of time from the entry time previously determined about the link from which the user vehicle 4 has exited last time, to the exit time determined at present. In this traffic information providing system 100, the period of time calculated by the calculating unit 44 is regarded as the "travel period" required for the vehicle to pass through a link. In other words, a travel period is defined as a difference between an exit time and entry time determined according to a prescribed determination method. In an embodiment, the exit time is determined from the position data acquired at various times before and after the vehicle passes through a node. However, the present invention is not limited to that. For example, since a vehicle often stops at a red light, the acquired time of the last position data acquired before the vehicle passes through a node may be regarded as the exit time, and the acquired time of the position data first acquired after the vehicle passes through the node may be regarded as the entry time.

When the travel period calculation ends, the second updating unit 45 rewrites the entry time stored in the second memory 152 to the entry time last determined by the calculating unit 44, and also rewrites the link identification data stored in the second memory 152 to the identification data about the link into which the user vehicle 4 has last entered. In this manner, the entry information 32 in the second memory 152 is switched from the information about the link from which the user vehicle 4 has already exited, to the information about the link in which the user vehicle 4 is currently traveling.

The transmitting unit 46 transmits a travel period calculated by the calculating unit 44 and stored in the fourth memory 154 (the transmission buffer) and link identification data to the wireless communication unit 13, which in turn transmits the travel period and the link identification data to the server 5. If a travel period estimated by the estimating unit 47 is written in the transmission buffer, the transmitting unit 46 transmits the estimated travel period to the server 5.

When the period of time from the entry time stored in the second memory 152 to the current time exceeds a given period of time, the estimating unit 47 determines the latest exit time and the latest entry time, based on the acquired time stored in the third memory 153 and the time when the position measuring unit 41 last acquired the position data. The estimating unit 47 further regards the travel period as the period of time required for the user vehicle 4 to pass through the link into which the user vehicle 4 has last entered, based on the determined exit time and the entry time stored in the second memory 152.

Figure 5:
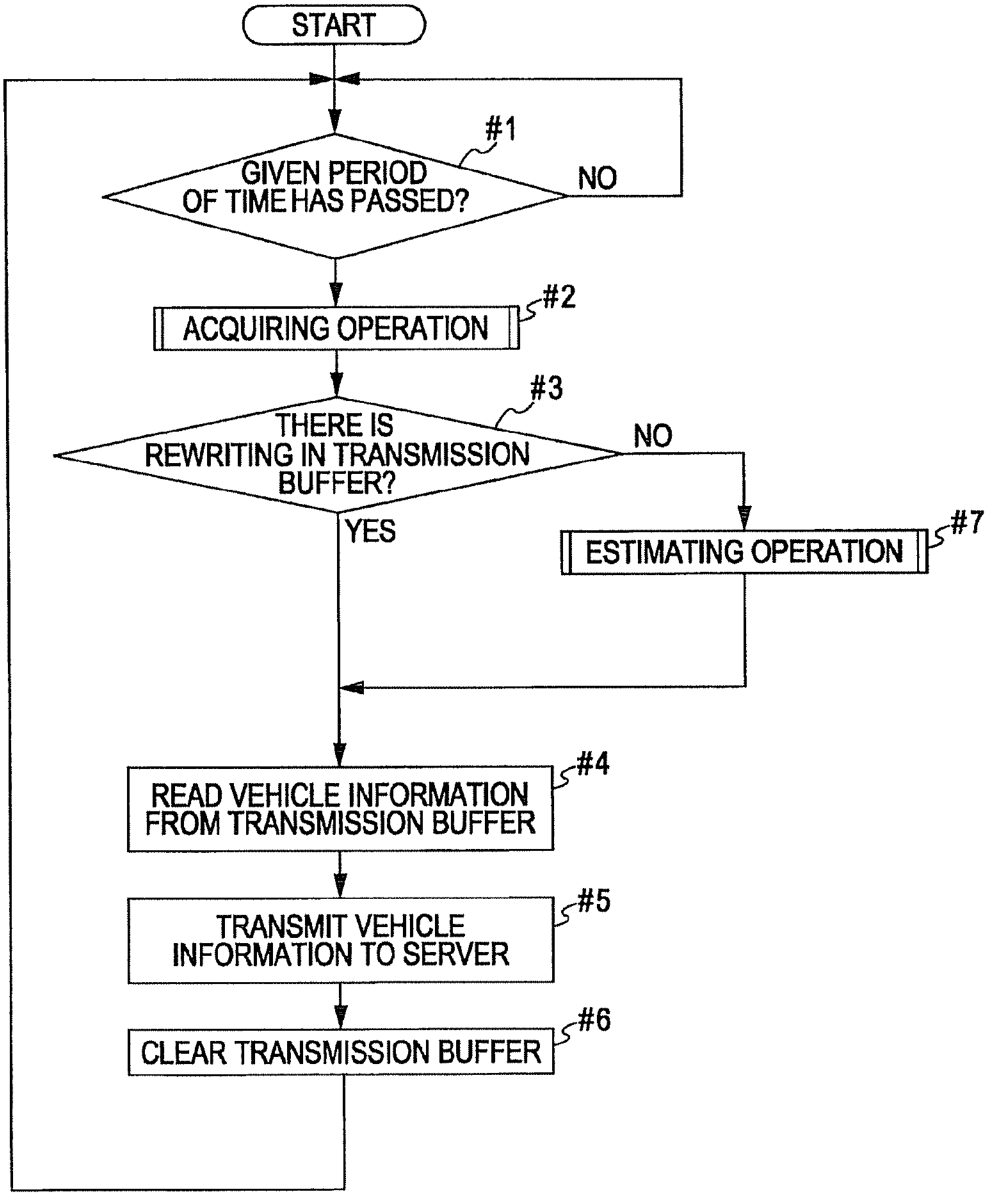
FIG. 5 is an operation chart depicting an example of an operation to be performed by a CPU.
Figure 6:
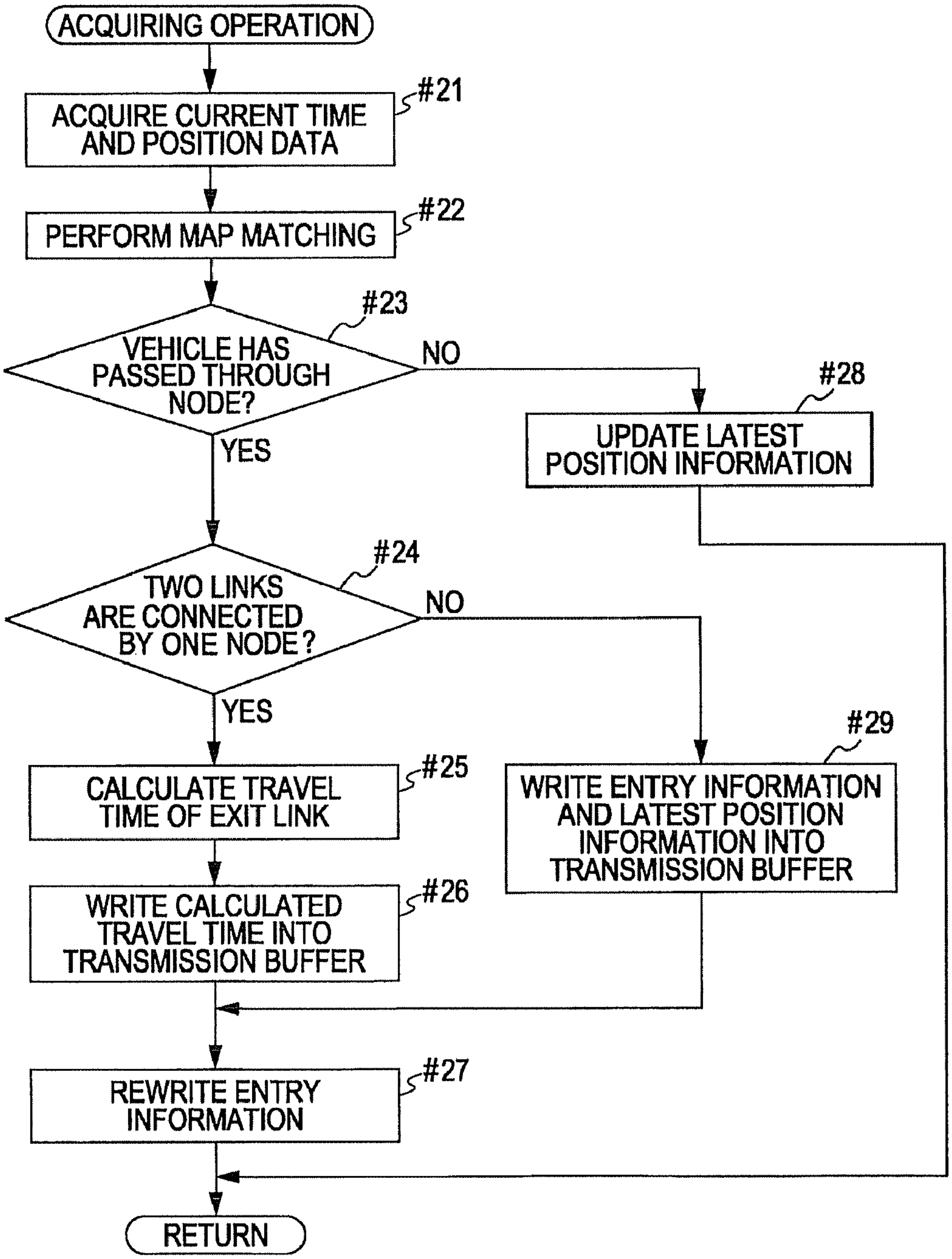
FIG. 6 is an operation chart of an acquiring routine of FIG. 5.
Figure 7:
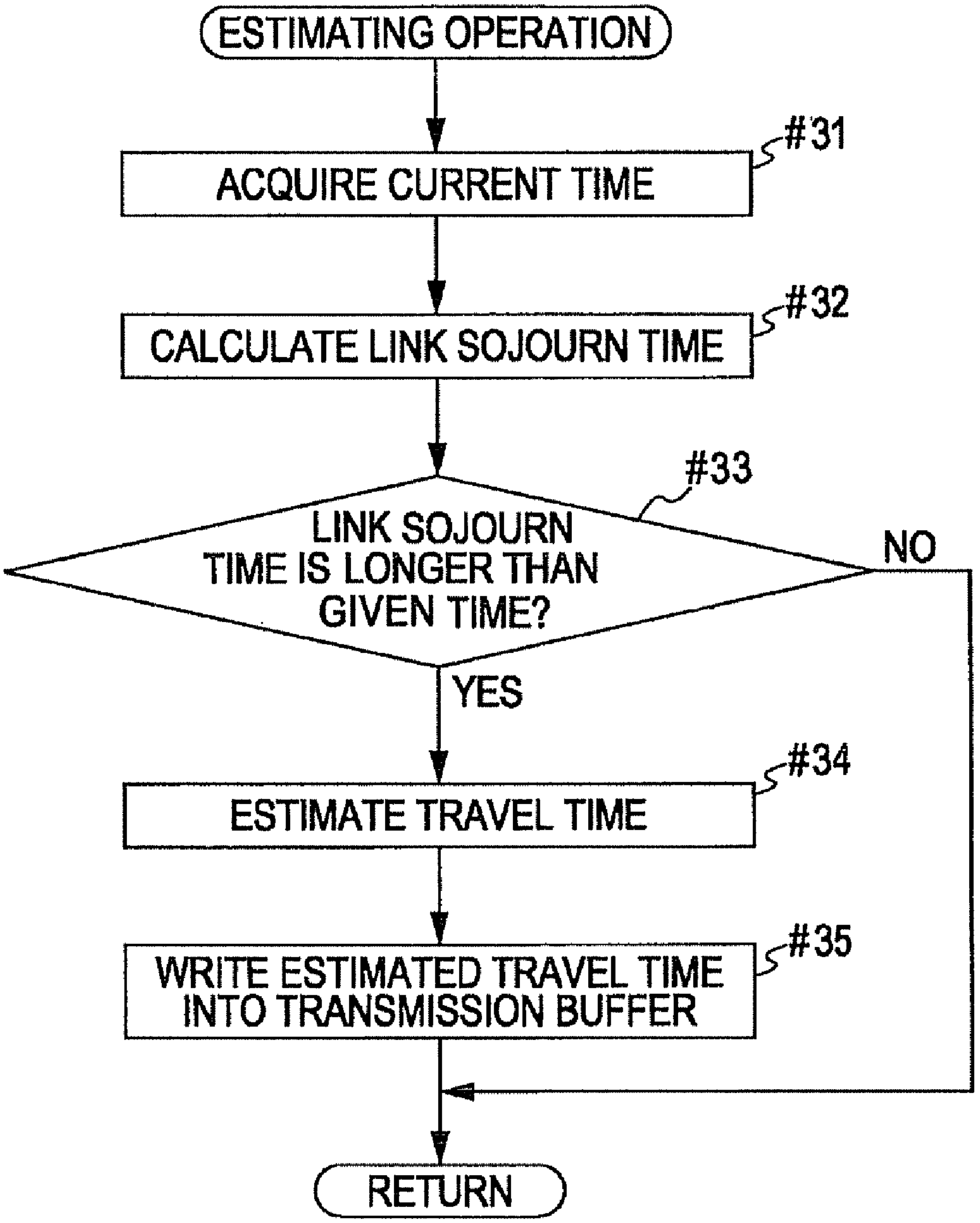
FIG. 7 is an operation chart of an estimating routine of FIG. 5.
Figure 8:
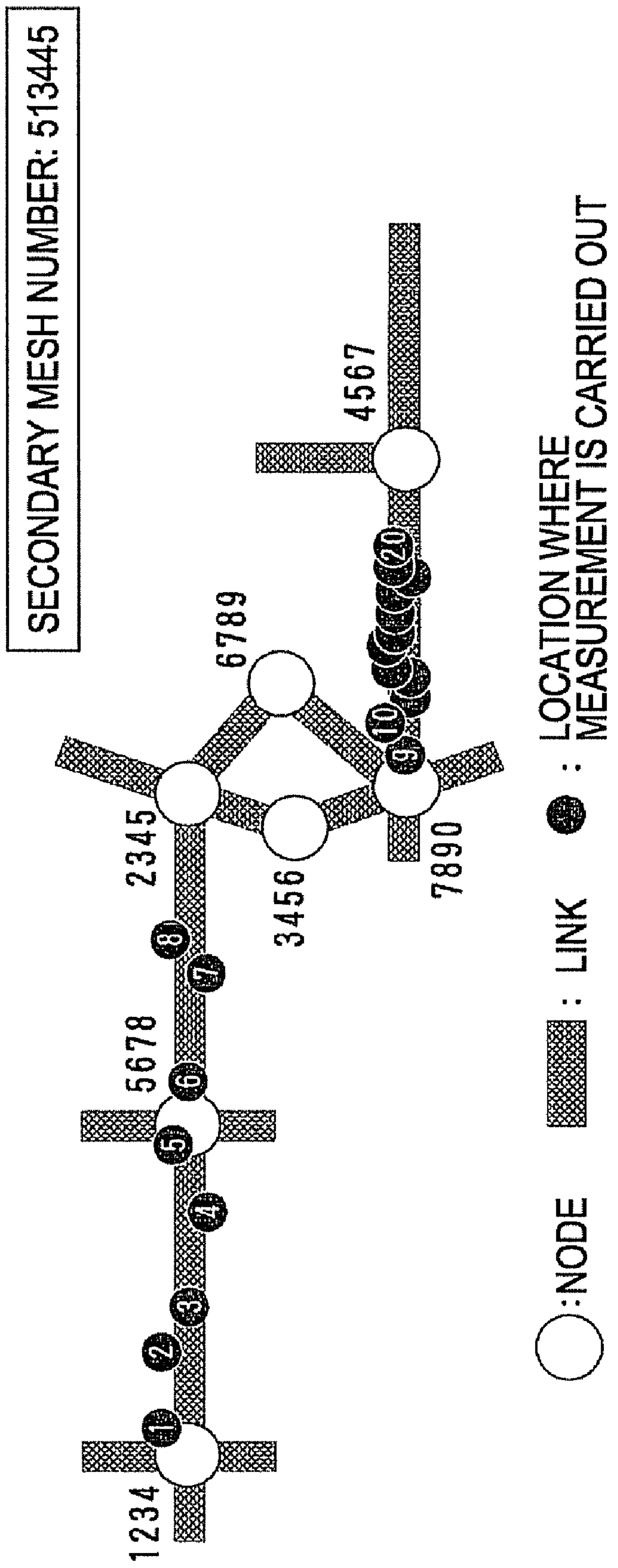
FIG. 8 is a diagram depicting an example of a road network and a position data acquiring condition.

Referring now to the operation charts in FIGS. 5 to 7, the operations of the data communication device 2 are described in greater detail. In the following description, the road network as depicted in FIG. 8 is used. In FIG. 8, each white circle represents a node, and each four-digit number near the circles represents a node number assigned to a node. Each of the links is identified by the node numbers assigned to the nodes existing at both ends of the link and the secondary mesh number assigned to the road network. In FIG. 8, each black circle represents a location at which position measurement is carried out, and the numbers in the respective black circles indicate the sequential order of the position measurement, for ease of explanation.

In FIG. 5, where the portable telephone device 1 and the server 5 of the traffic information providing system 100 are connected to each other via a communication line, the CPU 14 performs an acquiring operation every time a given period of time passes (at operations #1, #2). In the acquiring operation, the latest position data is obtained from the GPS unit 18. The given period of time should preferably be one second or shorter, so as to maintain accuracy in the travel period calculation. For example, where the given period of time is 0.1 seconds, and the vehicle is traveling at 40 kilometers per hour, the acquiring operation is performed every time the vehicle moves through a distance of approximately 1.1 meters.

If rewriting is performed in the transmission buffer that is the fourth memory 154 during the acquiring operation, the CPU 14 immediately reads the vehicle information from the transmission buffer after the end of the acquiring operation, and transmits the vehicle information to the server 5 (at operations #3, #4, #5). After the transmission, the CPU 14 clears the transmission buffer, so as to prepare for the next transmission (at operation #6). The procedures of operations #3 to #6 are equivalent to the above described functions of the transmitting unit 46.

The transmission performed immediately after the end of an acquiring operation contributes to an increase in immediacy of the traffic information to be distributed from the server 5 to the user vehicles 4, 4*a*, and 4*b*. Whenever vehicles periodically transmits (every five minutes, for example) to the server as same in typical cases, the vehicle information reflecting the traffic conditions observed during the interval between each two transmitting operations is not transmitted to the server 5. In the data communication device 2, on the other hand, updated vehicle information is transmitted to the server 5 immediately after the vehicle information is updated. Accordingly, the traffic information database 7 may be updated sooner at the service center.

If no rewriting is performed in the transmission buffer during the acquiring, an estimating is performed (at operation #3), and the contents of the transmission buffer are then transmitted. An estimating may be performed when a traffic jam occurs on the link on which the user vehicle 4 is located. While the user vehicle 4 stays on the link, the exit time is not known, and the travel period is hard to be calculated in a prescribed manner. However, the travel period may be estimated before the user vehicle 4 exits from the link. The estimated travel period is useful for the server 5 to check the conditions on the link. The estimating of operation #3 of FIG. 5 is equivalent to the above-described functions of the estimating unit 47, and will be depicted in greater detail in FIG. 7.

FIG. 6 is an operation flow of the procedures in the acquiring of operation #2 of FIG. 5.

The CPU 14 acquires the current time and the position data from the clock unit 17 and the GPS unit 18 (at operation #21). The procedures of operation #1 of FIG. 5 and operation #21 of FIG. 6 are equivalent to the functions of the position measuring unit 41.

Map matching is performed to compare the position data with the road map information 31 (at operation #22), and the link corresponding to the current position of the user vehicle 4 (or the position last measured) is identified through the map matching. A check is made to determine whether the user vehicle 4 has passed through a node (or whether there is an exit and an entry) (at operation #23). In this determination, the CPU 14 refers to the link identification data in the latest position information 33 depicted in FIG. 10. If the link stored in the third memory 153 is the same as the link newly identified, the user vehicle 4 is determined not to have passed through a node. If the link stored in the third memory 153 is not the same as the link newly identified, the user vehicle 4 is determined to have passed through a node. The procedures of operation #22 and operation #23 are equivalent to the functions of the determining unit 42.

If the user vehicle 4 is determined not to have passed through a node, the CPU 14 rewrites the acquired data (the position data and the acquired time) in the latest position information 33 to the data acquired at operation #21 (at operation #28). Since the link remains the same, there is no need to rewrite the link identification data. However, the link identification data may be overwritten with the same link identification data as before. The procedure of operation #28 is equivalent to the functions of the first updating unit 43.

If the user vehicle 4 is determined to have passed through a node, the CPU 14 determines whether the two links involved in the node passing determination are connected to each other by one node (at operation #24). For example, if the check is made at the location denoted by "6" in the road network assigned the secondary mesh number "513445" depicted in FIG. 8, the link from which the user vehicle 4 has last exited is the link represented by "1234-5678", and the link into which the user vehicle 4 has just entered is the link represented by "5678-2345". These two links are continuously connected to each other by one node "5678". If a check is made at the location denoted by "9", on the other hand, the link from which the user vehicle 4 has last exited is the link represented by "5678-2345", and the link into which the user vehicle 4 has just entered is the link represented by "7890-4567". These links are not connected to each other. Such a phenomenon in which two links identified in chronological order are not connected to each other might be caused due to poor reception of electric waves from GPS satellites.

If the two links are connected to each other, the CPU 14 moves on to operation #25, and calculates the travel period. As described above, the travel period is the difference between the entry times in the entry information 32 depicted in FIG. 9 and the exit time newly determined here.

Prior to the travel period calculation, the CPU 14 determines the exit time. According to a determination method employed herein, the CPU 14 determines that the exit time lies exactly between the time A when the user vehicle 4 was located at the closest measurement location to the exit-side node location (the exit point) on the link from which the user vehicle 4 exited, and the time B when the user vehicle 4 was located at the closest measurement location to the entry-side node location (the entry point) on the link into which the user vehicle 4 entered. The period of time from the time A to the time B is divided by 2, and the quotient is added to the time A, so as to determine the exit time. For example, if the exit time is determined at the location denoted by "6" in FIG. 8, the acquired time at the location denoted by "5" is the time A, and the acquired time at the location denoted by "6" is the time B. On the actual road, the determined exit time is substantially the same as the time when the user vehicle 4 passed by the center point of the intersection represented by the node "5678".

According to another method for determining the exit time, the period of time from the time A to the time B is not divided simply by 2, but the period of time from the time A to the time B is divided in accordance with the distance between the node position and the closest measurement location to the exit point, and the distance between the node position and the closest measurement location to the entry point (also an exit point). The time quotient corresponding to the distance between the measurement location on the exit side and the node is added to the time A, so as to determine the exit time. By this method, the exit time may be determined with higher precision.

By either determination method, the determined exit time is also the entry time when the user vehicle 4 has entered the new link. In other words, when an exit time is determined, an entry time is determined at the same time.

The travel period obtained through the calculation is written into the transmission buffer (at operation #26). The travel period is pieces of the vehicle information 34 as depicted in FIGS. 11A to 11C. The vehicle information 34 contains not only the travel period but also the identification data about the link on which the travel period has been determined, the acquired data about the measurement location closest to the entry point, the acquired data about the measurement location closest to the exit point, and the type of data.

The type of data contained in the vehicle information 34 is represented by one of the values "1", "2", and "3", and represents the attribute of a travel period. In a case where a travel period is calculated at operation #25, the value of the type of data is "1", and the vehicle information 34 having the contents depicted in FIG. 11A is transmitted to the server 5.

Referring back to FIG. 6, if the determination result of operation #24 is "NO", or if the two subject links are not connected to each other, the procedure of operation #29 is carried out. At operation #29, the CPU 14 transfers the entry information 32 and the latest position information 33 as the vehicle information 34 from the second memory 152 and the third memory 153 to the transmission buffer (the fourth memory 154). Here, the acquired data related to the measurement location closest to the exit point included in the vehicle information 34 is the acquired data in the latest position information 33.

When such a transfer is performed, the value of the type of data contained in the vehicle information 34 is "2", which indicates that the travel period has not been calculated. The vehicle information 34 having the contents depicted in FIG. 11B is transmitted to the server 5. The travel period remains cleared. Upon receipt of the vehicle information 34, the server 5 estimates the unclear traveled route by performing a shortest path search, and also estimates the travel period on the subject link. The server 5 then adds the results to the traffic information database 7.

The procedures of operations #24 to #26 and the procedure of operation #29 are equivalent to the functions of the calculating unit 44.

Whether the determination result of operation #24 is "YES" or "NO", the CPU 14 rewrites the entry information 32 at operation #29. If the entry time is determined at operation #25, the determined entry time and the acquired data about the measurement location closest to the subject entry point in the determination are written into the second memory 152. If the entry time is not determined, the time when the position data was acquired last time (the time at the location “9” in the example in FIG. 8) is written as the entry time into the second memory 152. The procedure of operation #27 is equivalent to the functions of the second updating unit 45.

FIG. 7 depicts an example of the procedures of the estimating operation of operation #7 of FIG. 5.

The CPU 14 obtains the current time from the clock unit 17, and calculates the link sojourn time (at operations #31, #32). The link sojourn time is the period of time from the entry time stored in the second memory 152 to the current time.

The CPU 14 then determines whether the link sojourn time is longer than a given period of time (at operation #33). A certain period of time such as 10 minutes may be applied as the given period of time to any link. However, the present invention is not limited to that arrangement, and the given period of time may be varied in accordance with the length of each link. For example, the link length included in the road map information 31 may be divided by a speed considered as the speed in a traffic jam (10 kilometers per hour, for example), and the result of the division may be used as the given period of time.

If the link sojourn time is not longer than the given period of time, the operation moves back to the main routine through the estimating operation routine.

If the link sojourn time is longer than the given period of time, the CPU 14 estimates the travel period in the following manner (at operation #34). The road map information 31 is searched, with the key being the node number 1 in the entry information 32 stored in the second memory 152. The node number 1 identifies the node on the entry side. The position data (the latitude and longitude) about the node is then acquired. The travel distance that is the distance between the node and the current position is determined from the acquired node position data and the position data in the latest position information 33 stored in the third memory 153. The travel distance is divided by the difference between the entry time in the entry information 32 and the acquired time in the latest position information 33, so as to obtain the mean vehicle speed. The link length of the subject link in the road map information 31 is divided by the mean vehicle speed, and the result of the division is used as the estimated value of the travel period.

The estimated travel period is written into the transmission buffer (at operation #35). The value of the type of data in the vehicle information 34 is changed to “3”, which indicates that the travel period is an estimated value. At operation #5 of the main routine (see FIG. 5), the vehicle information 34 having the contents depicted in FIG. 11C is transmitted to the server 5.

In the above operation, the vehicle information 34 is transmitted to the server 5 immediately after the travel period is calculated or estimated. As described above, the immediacy of information distribution is increased in this successive transmission. However, the present invention is not limited to this embodiment. For example, travel periods may be stored over a certain period of time, and the vehicle information may be transmitted to the server 5 at certain intervals. This method is called a batch method. In a case where transmission is performed by the batch method, the vehicle information 34*b* having the contents depicted in FIG. 12 is transmitted to the server 5. The vehicle information 34*b* includes an item that shows codes (ID) corresponding to identifying records.

In accordance with the above-described embodiment, to transmit the travel period to the server 5, the acquirement information (location and time) about an entry into a link on which the subject vehicle is traveling, the acquirement information about an exit, the link identification information, and the travel period should be temporarily stored in the data communication device 2 serving as a mobile terminal. Since the data stored in the third memory 153 is successively updated, the memory capacity may be made smaller.

The embodiment in which the travel period is calculated in the user vehicle 4 and is transmitted to the server 5 has the advantage that the data amount required for the server 5 to acquire the travel period of one link in a communication from the vehicle to the server 5 is smaller than in a typical case where position measurement information is accumulated in the vehicle and is transmitted to the server on a regular basis. More specifically, the data amount of the vehicle information 34 having the structure depicted in any of FIGS. 11A to 11C is 67 bytes, which is less than one packet in a packet communication on a 128-byte packet basis. The breakdown of the 67 bytes is: 10 bytes for the terminal identification code, 1 byte for the type of data, 4 bytes for the secondary mesh number, 4×2 bytes for the node numbers, 4 bytes for the travel period, 4×2 bytes for the current time, and 16×2 bytes for the latitude and longitude. In a typical case where position measurement is carried out at one-second intervals, and transmission is performed at five-minute intervals, the transmission information to be transmitted in one transmitting operation is the position measurement information about 300 position measuring operations, and the data amount is 6010 bytes, which is equivalent to 47 packets. The breakdown of the 6010 bytes is: 10 bytes for the terminal identification code, 4×300 bytes for the current time, and 16×300 bytes for the latitude and longitude.

A smaller communication data amount is preferable in lowering the communication costs and avoiding congestion. Even if the communication fees are charged on a pay-as-you-go basis, the amount of money the service user has to pay is small, as long as the communication data amount is small. This advantage contributes to the spread of the services. As the number of user vehicles 4, 4*a*, and 4*b* becomes larger, more sophisticated services may be provided to distribute more specific traffic information about wider areas.

Furthermore, according to the above-described embodiment, if the travel period is hard to be calculated since the vehicle is hard to pass through the link within a given period of time, the travel period is estimated and transmitted together with the type of data to the server 5. Accordingly, a prompt check may be made at the service center to determine whether there is traffic congestion.

The present invention is suitable for portable devices having a limited memory capacity, but may be applied to fixed-type devices that are to be incorporated into vehicles and may have relatively large-capacity memories mounted thereon. The hardware structure, the data structure of each type of information to be temporarily stored, the position measurement method, and the procedures to be carried out between the acquirement of position data through position measurement and the transmission of the vehicle information are not limited to the procedures of this embodiment. The portable telephone devices 1, 1*a*, and 1*b* may be connected to a navigation device or a display device, so as to incorporate a function to display easy-to-see traffic information into the data communication device 2.

Although traffic information is distributed to the user vehicles 4, 4*a*, and 4*b* with the use of the portable telephone devices 1, 1*a*, and 1*b* in the traffic information providing system 100, it is also possible to employ a system that does not involve the portable telephone devices 1, 1*a*, and 1*b* to distribute traffic information. In such a system, the portable telephone devices 1, 1*a*, and 1*b* are used by the center to gather probe information, and the data communication devices 2, 2*a*, and 2*b* incorporated into the respective portable telephone devices 1, 1*a*, and 1*b* transmit vehicle information, but do not receive traffic information.

Figure 13:
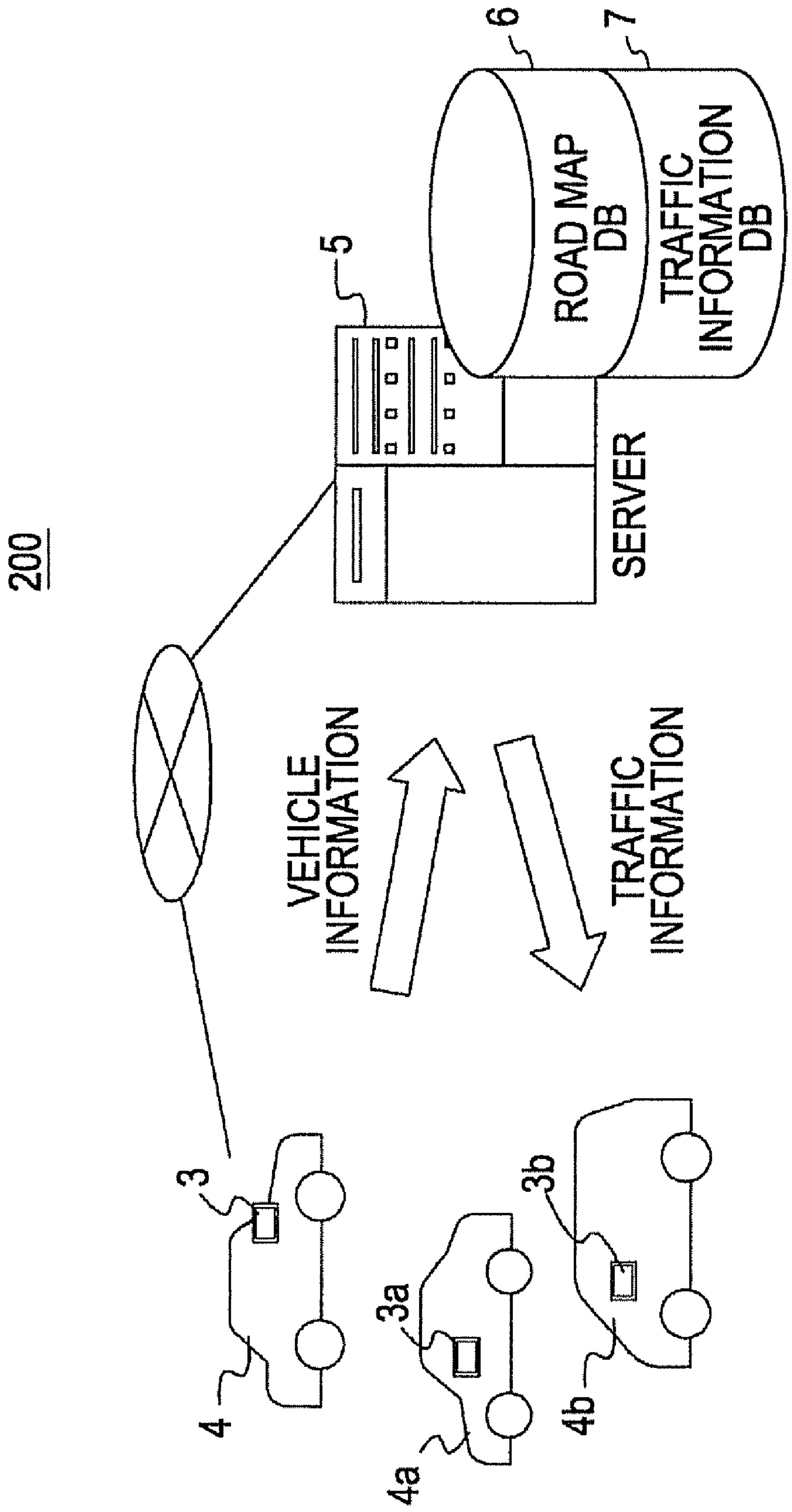
FIG. 13 is a diagram depicting a structure example of another traffic information providing system.
Figure 14:
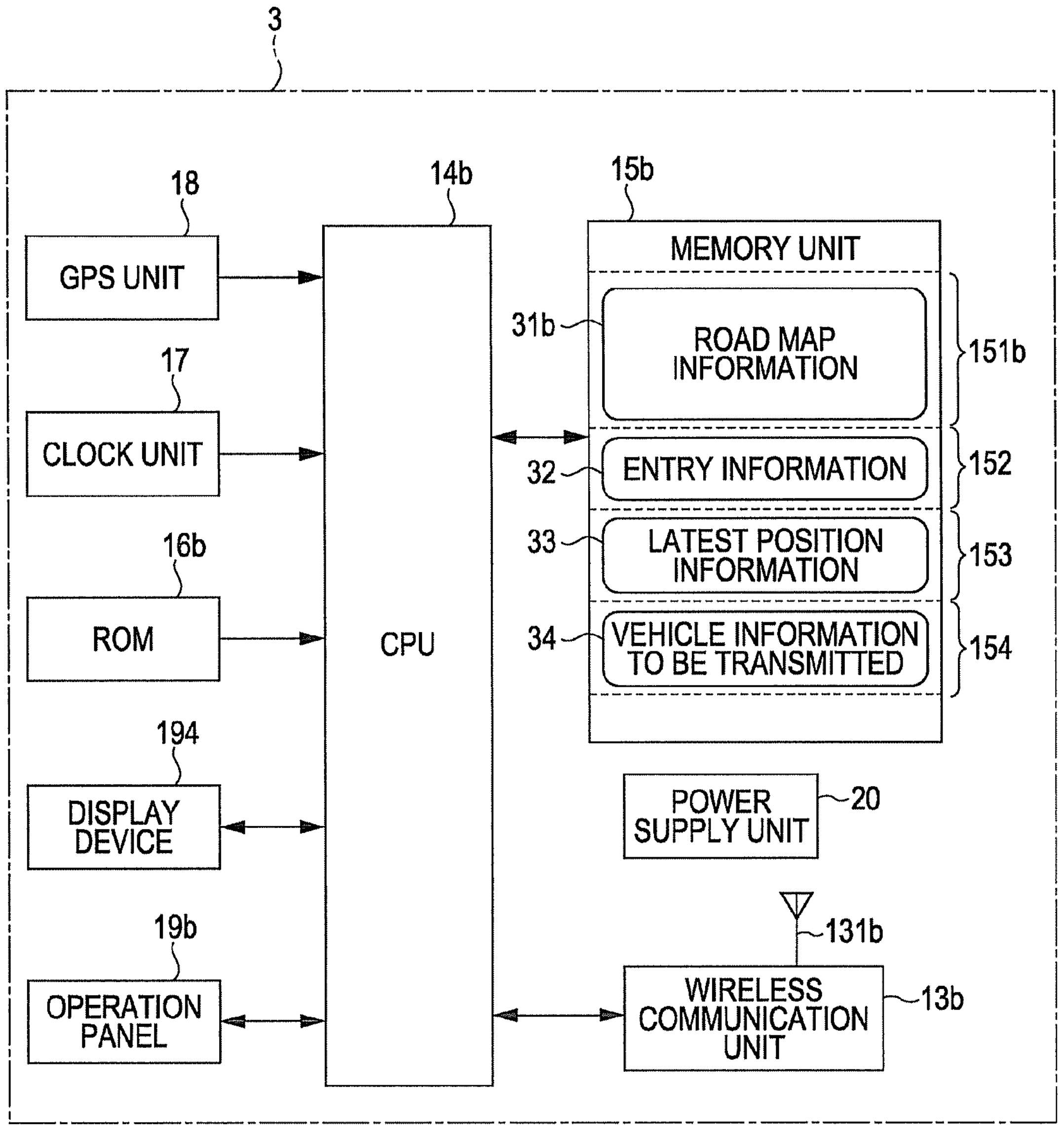
FIG. 14 is a diagram depicting a structure example of a car navigation device according to an embodiment.

FIG. 13 depicts a structure of a traffic information providing system 200 according to an embodiment. FIG. 14 depicts the structure of a car navigation device according to an embodiment. In these drawings, the same components as those depicted in FIGS. 1 and 3 are denoted by the same reference numerals as those used in FIGS. 1 and 3, and explanation thereof is omitted or simplified herein.

As depicted in FIG. 13, the traffic information providing system 200 includes user vehicles 4, 4*a*, and 4*b*, and a server 5*b* provided at a service center. The traffic information providing system 200 provides services to distribute traffic information to vehicles. Fixed or portable car navigation devices 3, 3*a*, and 3*b* are incorporated as data communication devices (terminal devices) to be used in the services, into the user vehicles 4, 4*a*, and 4*b*. The car navigation devices 3, 3*a*, and 3*b* and the server 5*b* perform data communications via a wireless network. The car navigation devices 3, 3*a*, and 3*b* calculate the travel period in the same manner as the data communication devices 2, 2*a*, and 2*b* in the above-described embodiment, and transmit the vehicle information containing the calculated travel period to the server 5*b*. Since the car navigation devices 3, 3*a*, and 3*b* include the same structures as one another, only the structure of the car navigation device 3 is described below as a typical example.

The car navigation device 3 calculates the travel period in the same manner as the data communication devices 2, 2*a*, and 2*b* in the above-described embodiment, and transmits the vehicle information containing the calculated travel period to the server 5*b*. To do so, the car navigation device 3 includes: a memory unit 15*b* that provides a first memory 151*b*, a second memory 152, a third memory 153, and a fourth memory 154 as work areas; a CPU 14*b* that is formed with a microcomputer to realize the same functions as the processing units 41 to 47 depicted in FIG. 4; a ROM 16*b* that stores programs to be executed by the CPU 14*b*; and a wireless communication unit 13*b* that has an antenna 131*b*. The first memory 151*b* stores road map information 31*b* about the surrounding areas of the current position. The road map information 31*b* is downloaded from the server 5*b* or read from a recording medium (not depicted) held by the car navigation device 3.

Furthermore, the car navigation device 3 inquires with the server 5*b* about the travel period, and displays an expected time required between the current position and the destination. To do so, the car navigation device 3 includes an operation panel 19*a* for a user to input a destination, and a liquid crystal display 194 that is a device for displaying the expected necessary time. The operation panel 19*b* includes a speaker for audio guidance. Among the functions to be realized by the CPU 14*b*, the transmitting unit 47 transmits the identification data about each of the links constituting a route to the server 5*b*, when the route to the destination is determined in the later-described car navigating operation.

Figure 15:
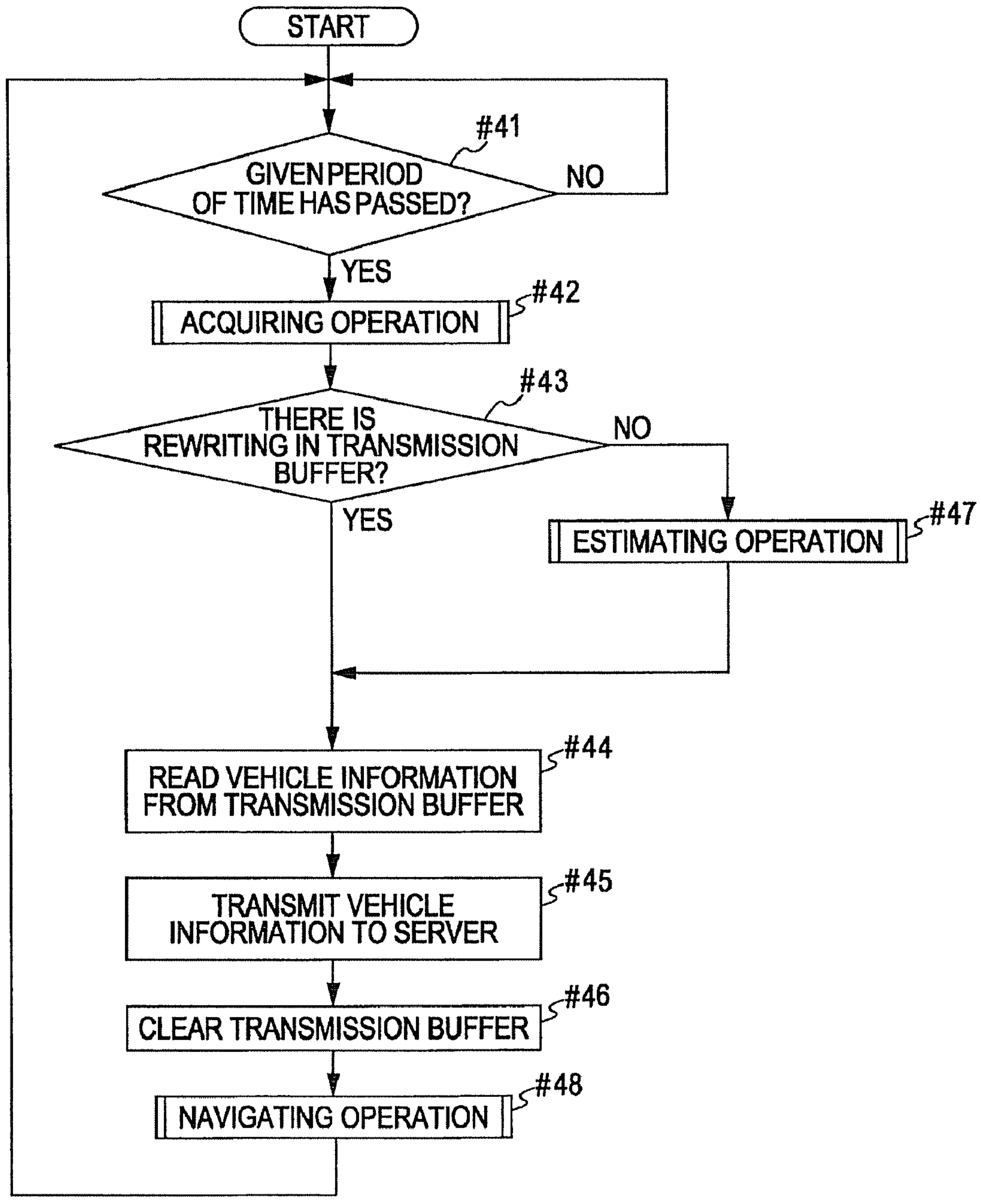
FIG. 15 is an operation chart depicting an example of an operation to be performed by the CPU according to an embodiment.

As depicted in FIG. 15, the CPU 14*b* of the car navigation device 3 carries out the series of procedures of operations #41 to #47 (the procedures for transmitting the vehicle information) and the navigating operation of operation #48. The procedures of the navigating operation are depicted in FIG. 16.

Figure 16:
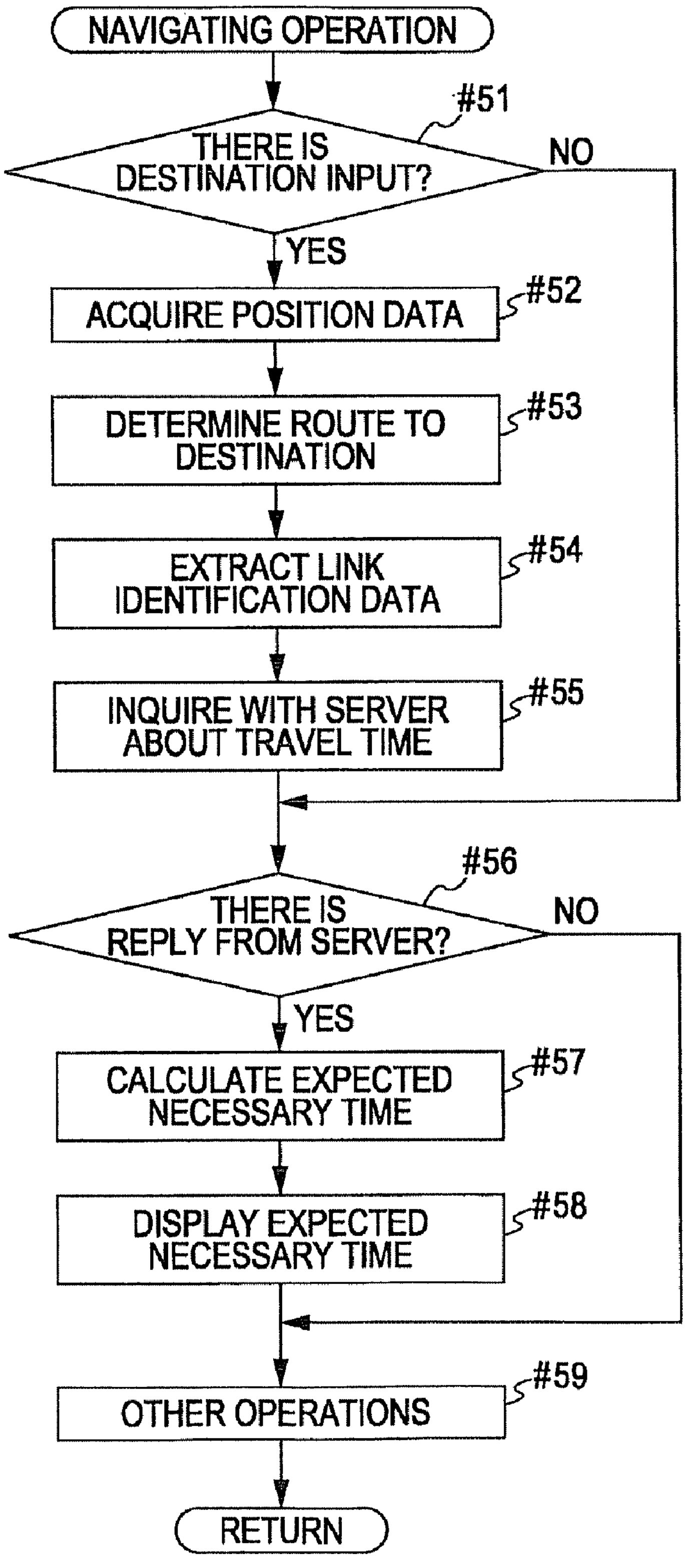
FIG. 16 is an operation chart depicting an example of the navigating routine of FIG. 15.

In FIG. 16, when the user on the vehicle 4 inputs a destination to the car navigation device 3, the CPU 14*b* acquires position data from the GPS unit 18 (at operations #51, #52). The CPU 14*b* then performs a route search to determine the route from the current position indicated by the acquired position data to the destination designated by the user (at operation #53), and extracts the identification data about the links constituting the determined route, from the road map information 31*b* (at operation #54). The CPU 14*b* transmits the set of extracted identification data to the server 5*b*, and inquires with the server 5*b* about the travel period of each of the links (at operation #55). In turn, the server 5*b* refers to the traffic information database 7, and transmits the travel period of each of the requested links as an expected travel period to the car navigation device 3. Upon receipt of the response from the server 5*b*, the CPU 14*b* adds up the travel periods of the respective links to calculate an expected time required to reach the destination (at operation #57), and displays the expected time required to reach the destination, as well as the map that emphasizes the route from the current position to the destination (at operation #58). After that, as the vehicle 4 moves on, the other procedures including the procedures for successively updating the map and locator display are carried out (at operation #59). In the other procedures, given procedures for following the movement of the vehicle 4 are carried out in parallel with the series of procedures for transmitting the vehicle information to the server 5*b*. In other words, while displaying or vocally announcing a route, the car navigation device 3 calculates the travel period of a passed link every time it passes through a node, and transmits the travel period to the server 5*b*.

The procedure of operation #51 in the navigating operation is equivalent to the function of the CPU 14*b* as an input unit. The procedures of operations #52 and #53 are equivalent to the functions of the CPU 14*b* as a route determining unit. The procedure of operation #56 is equivalent to the function of the CPU 14*b* as a receiving unit. The procedures of operations #57 and #58 are equivalent to the functions of the CPU 14*b* as a display unit.

A method and system are provided to periodically obtain (collect) position data of a vehicle from a portable device and calculating a period indicating a time required to reach a destination based on an updated version of the position data. While a specific example of a portable device is illustrated herein, the present invention is not limited to any particular type of device.

The embodiments may be implemented in computing hardware (computing apparatus) and/or software, such as (in a non-limiting example) any computer that may store, retrieve, process and/or output data and/or communicate with other computers. The results produced may be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A data communication device that is capable of being mounted on a vehicle, comprising:

a first memory configured to store road map information indicating locations of a plurality of nodes assigned with numbers in a road network that is represented by the plurality of nodes and a plurality of links each connecting two adjacent ones of the nodes;

a second memory configured to store a time when the vehicle enters a link among the plurality of links, and identification data about the link corresponding to the time;

a third memory configured to store a location of the vehicle at a certain time and identification data about the link corresponding to the location;

a position measuring unit configured to periodically acquire position data indicating a location of the vehicle;

a determining unit configured to identify a link corresponding to an acquired latest position data based on the road map information every time position data is acquired, and compare the identified link with the link stored in the third memory to determine whether the vehicle has passed through a node;

a first updating unit configured to receive an indication that the vehicle has not passed through the node, and rewrite the position data and acquired time stored in the third memory to the last acquired position data and the acquired time;

a calculating unit configured to receive an indication that the vehicle has passed through the node, determine an exit time based on the acquired time stored in the third memory and a time the last acquired position data is obtained, and calculate a travel period indicating a time required for the vehicle to pass through the link from which the vehicle has last exited including while the vehicle is traveling through the link, based on the determined exit time and the entry time stored in the second memory;

a second updating unit configured to write the exit time last determined by the calculating unit as an entry time in place of the entry time stored in the second memory after the the travel period calculation, and rewrite the link identification data stored in the second memory to the identification data about the link last identified by the determining unit; and a transmitting unit configured to transmit the calculated travel period and the identification data about the corresponding link to a given communication destination.

2. The data communication device according to claim 1, wherein the transmitting unit transmits the travel period every time the travel period is calculated.

3. The data communication device according to claim 1, comprising:

an input unit configured to receive a destination input;

a route determining unit configured to refer to the road map information, and determine a set of links the vehicle is to pass through before reaching the destination in response to the destination input;

a receiving unit configured to receive an expected travel period of each link in the set of links from a communication destination; and a display device configured to refer to the road map information, and display map information indicating each of the links and an expected travel period, based on the received expected travel period of each link, and wherein the transmitting unit transmits identification data about each of the links in the set of links to the communication destination, when the set of links are determined.

4. The data communication device according to claim 1, wherein in the data communication device is incorporated into a portable telephone device.

5. The data communication device according to claim 2, wherein in the data communication device is incorporated into a portable telephone device.

6. The data communication device according to claim 3, wherein in the data communication device is incorporated into a portable telephone device.

7. The data communication device according to claim 1, wherein in the data communication device is incorporated into the vehicle.

8. The data communication device according to claim 2, wherein in the data communication device is incorporated into the vehicle.

9. The data communication device according to claim 3, wherein in the data communication device is incorporated into the vehicle.

10. The data communication device according to claim 1, wherein the calculating unit calculates the travel period, in case that the link corresponding to the position data stored in the third memory and the link corresponding to the last acquired position data are connected to each other by one node, and does not calculate the travel period in other case; and the transmitting unit transmits the calculated travel period and the identification data about the corresponding link to a given communication destination, when the calculating unit calculates the travel period, and transmits the information stored in the second memory and the third memory to the communication destination, when the calculating unit does not calculate the travel period.

11. The data communication device according to claim 2, wherein the calculating unit calculates the travel period, in case that the link corresponding to the position data stored in the third memory and the link corresponding to the last acquired position data are connected to each other by one node, and does not calculate the travel period in other case; and the transmitting unit transmits the calculated travel period and the identification data about the corresponding link to a given communication destination, when the calculating unit calculates the travel period, and transmits the information stored in the second memory and the third memory to the communication destination, when the calculating unit does not calculate the travel period.

12. The data communication device according to claim 3, wherein the calculating unit calculates the travel period, in case that the link corresponding to the position data stored in the third memory and the link corresponding to the last acquired position data are connected to each other by one node, and does not calculate the travel period in other case; and the transmitting unit transmits the calculated travel period and the identification data about the corresponding link to a given communication destination, when the calculating unit calculates the travel period, and transmits the information stored in the second memory and the third memory to the communication destination, when the calculating unit does not calculate the travel period.

13. The data communication device according to claim 1, comprising:

an estimating unit configured to determine the latest exit time based on the acquired time stored in the third memory and the time when the position measuring unit has last acquired position data, when the period of time between the entry time stored in the second memory and the current time exceeds a given period of time, and estimate the time required for the vehicle to pass through the link the vehicle has last entered, based on the determined exit time and the entry time stored in the second memory; and the transmitting unit transmits the time estimated by the estimating unit as the travel period to a communication destination.

14. The data communication device according to claim 2, comprising:

an estimating unit configured to determine the latest exit time based on the acquired time stored in the third memory and the time when the position measuring unit has last acquired position data, when the period of time between the entry time stored in the second memory and the current time exceeds a given period of time, and estimate the time required for the vehicle to pass through the link the vehicle has last entered, based on the determined exit time and the entry time stored in the second memory; and the transmitting unit transmits the time estimated by estimating unit as the travel period to a communication destination.

15. The data communication device according to claim 3, comprising:

an estimating unit configured to determine the latest exit time based on the acquired time stored in the third memory and the time when the position measuring unit has last acquired position data, when the period of time between the entry time stored in the second memory and the current time exceeds a given period of time, and estimate the time required for the vehicle to pass through the link the vehicle has last entered, based on the determined exit time and the entry time stored in the second memory; and the transmitting unit transmits the time estimated by estimating unit as the travel period to a communication destination.

16. The data communication device according to claim 10, comprising:

an estimating unit configured to determine the latest exit time based on the acquired time stored in the third memory and the time when the position measuring unit has last acquired position data, when the period of time between the entry time stored in the second memory and the current time exceeds a given period of time, and estimate the time required for the vehicle to pass through the link the vehicle has last entered, based on the determined exit time and the entry time stored in the second memory; and the transmitting unit transmits the time estimated by estimating unit as the travel period to a communication destination.

17. The data communication device according to claim 4, comprising:

an estimating unit configured to determine the latest exit time based on the acquired time stored in the third memory and the time when the position measuring unit has last acquired position data, when the period of time between the entry time stored in the second memory and the current time exceeds a given period of time, and estimate the time required for the vehicle to pass through the link the vehicle has last entered, based on the determined exit time and the entry time stored in the second memory; and the transmitting unit transmits the time estimated by estimating unit as the travel period to a communication destination.

18. A data communication system in which a data communication device communicates data with a server, comprising:

the data communication device, capable of being mounted on a vehicle, including:

a first memory configured to store road map information indicating locations of a plurality of nodes assigned with numbers in a road network that is represented by the nodes and a plurality of links each connecting two adjacent ones of the nodes, a second memory configured to store a time when the vehicle enters a link, and identification data about the link, a third memory configured to store a location of the vehicle at a certain time, and identification data about the link corresponding to the location, a position measuring unit configured to periodically acquire position data indicating a location of the vehicle, a determining unit configured to identify a link corresponding to an acquired latest position data based on the road map information every time position data is acquired, and comparing the identified link with the link stored in the third memory to determine whether the vehicle has passed through a node, a first updating unit configured to receive an indication that the vehicle has not passed through a node, and rewriting the position data and acquired time stored in the third memory to the last acquired position data and acquired time, a calculating unit configured to receive an indication that the vehicle has passed through the node, determine a latest exit time based on the acquired time stored in the third memory and a time last acquired position data is obtained, and calculate a travel period indicating a time required for the vehicle to pass through the link from which the vehicle has last exited including while the vehicle is traveling through the link, based on the determined exit time and the entry time stored in the second memory, a second updating unit configured to write the exit time last determined by the calculating unit as an entry time in place of the entry time stored in the second memory after the end of the travel period calculation, and rewrite the link identification data stored in the second memory to the identification data about the link last identified by the determining unit, and a transmitting unit configured to transmit the calculated travel period and the identification data about the corresponding link to the server; and the server including:

a receiving unit receiving the calculated travel period and the identification data.

19. A computer-readable recording medium storing a computer program for causing a computer to function as a data communication device capable of being mounted on a vehicle via a wireless network, the computer program causing the computer to execute an operation comprising:

periodically acquiring position data indicating a location of the vehicle;

identifying a link corresponding to an acquired latest position data based on road map information every time position data is acquired, and comparing the identified link with a link stored to determine whether the vehicle has passed through a node, the road map information indicating a location of each of a plurality of nodes in a road network that is represented by the nodes assigned with numbers stored and a plurality of links connecting each two adjacent ones of the nodes;

executing a first rewriting of the position data and acquired time stored in the third memory to the last acquired position data and acquired time, upon receipt of an indication that the vehicle has not passed through a node;

determining, upon receipt of an indication that the vehicle has passed through a node, a latest exit time based on the acquired time stored in the third memory and a time last acquired position data is obtained, and calculating a travel period indicating a time required for the vehicle to pass through the link from which the vehicle has last exited including while the vehicle is traveling through the link, based on the determined exit time and an entry time stored in a second memory;

executing a second writing of the exit time last determined through the calculating as an entry time in place of the entry time stored in the second memory after the end of the travel period calculation, and rewriting link identification data stored in the second memory to identification data about the link last identified through the acquiring; and transmitting the calculated travel period and the identification data about the corresponding link to a given communication destination.

20. An information gathering method for gathering information from a data communication device capable of being mounted on a vehicle in a traffic information providing system, the information being gathered by a server in the traffic information providing system, the method causing the data communication device to execute an operation, comprising:

storing road map information in a first memory, the road map information indicating locations of a plurality of nodes assigned with numbers in a road network that is represented by the nodes and a plurality of links each connecting two adjacent ones of the nodes;

storing a time when the vehicle enters a link, and identification data about the link in a second memory;

storing a location of the vehicle at a certain time, and identification data about the link corresponding to the location in a third memory, the data communication device carrying out an operation including:

periodically acquiring position data indicating a location of the vehicle;

identifying a link corresponding to an acquired latest position data based on the road map information every time position data is acquired, and comparing the identified link with the link stored in the third memory to determine whether the vehicle has passed through a node;

updating the position data and acquired time stored in the third memory to the last acquired position data and acquired time, when the vehicle has not passed through the node;

determining a latest exit time based on the acquired time stored in the third memory and a time last acquired position data is obtained, and calculating a travel period indicating a time required for the vehicle to pass through the link from which the vehicle has last exited including while the vehicle is traveling through the link, based on the determined exit time and the entry time stored in the second memory, when the vehicle has passed through the node;

writing the last determined exit time as an entry time in place of the entry time stored in the second memory after the end of the travel period calculation, and rewriting the link identification data stored in the second memory to the identification data about the last identified link; and transmitting the calculated travel period and the identification data about the corresponding link to the server.

* * * * *

UNITED STATES PATENT AND TRADEMARK OFFICE

CERTIFICATE OF CORRECTION

PATENT NO. : 8,315,785 B2
APPLICATION NO. : 12/618188
DATED : November 20, 2012
INVENTOR(S) : Kyouko Okuyama It is certified that error appears in the above-identified patent and that said Letters Patent is hereby corrected as shown below:

In the Claims:

Column 15, Line 67, In Claim 1, delete “the the” and insert -- the --, therefor.

Signed and Sealed this
Fourth Day of June, 2013

Teresa Stanek Rea
*Acting Director of the United States Patent and Trademark Office*